Dec. 7, 1943.  W. SCHADE  2,336,300
LENS
Filed Sept. 17, 1941

| F = 100 mm | | | | f/2.7 |
|---|---|---|---|---|
| LENS | $N_D$ | V | RADII | THICKNESSES |
| I | 1.620 | 60.4 | $R_1$ = + 39.0mm<br>$R_2$ = + 201.8 | $t_1$ = 6.5 mm<br>$S_1$ = 0.2 |
| II | 1.617 | 38.5 | $R_3$ = + 103.6 | $t_2$ = 2.0 |
| III | 1.744 | 45.7 | $R_4$ = + 27.0<br>$R_5$ = + 194.6 | $t_3$ = 7.5 |
| IV | 1.605 | 43.6 | $R_6$ = − 132.2<br>$R_7$ = + 28.9 | $S_2$ = 2.0<br>$t_4$ = 1.9<br>$S_3$ = 10.7 |
| V | 1.523 | 50.9 | $R_8$ = +1290.0<br>$R_9$ = + 38.5 | $t_5$ = 2.0 |
| VI | 1.620 | 60.4 | $R_{10}$ = − 62.2 | $t_6$ = 8.0<br>BF = 73.3 |

WILLY SCHADE
INVENTOR
BY
ATTORNEY

Patented Dec. 7, 1943

2,336,300

UNITED STATES PATENT OFFICE 2,336,300

LENS

Willy Schade, Rochester, N. Y., assignor to Eastman Kodak Company, Rochester, N. Y., a corporation of New Jersey Application September 17, 1941, Serial No. 411,181

6 Claims. (Cl. 88—57)

This invention relates to lens systems and particularly to high aperture photographic objectives.

An object of this invention is to provide a photographic objective with an aperture greater than f/3.0, covering a large field with an angle of about 25° or more from the axis, more economical to manufacture, and with better corrections of zonal aberrations and oblique spherical aberration than heretofore.

In the development of high aperture photographic objectives an important step was the splitting of the front component of the Cooke triplet type into two positive components at least the second of which counting from the front of the objective is meniscus in shape and convex toward the front. This step resulted in a decidedly new type of objective which has developed into a number of forms, in some of which all four components consists of simple lenses while in others one or more of the components is compounded. Even with the simple components, the zonal aberrations were so reduced as to constitute a notable advance over previously known three- or four-component objectives and to make possible about twice the speed with equal covering power.

Generally the best results in regard to the correction of the usual first order aberrations and the zonal aberrations have been obtained in objectives of this type by the following features. The front surface has a radius of curvature between 0.3 F and F where F is the focal length of the objective. The focal length of the second component is between ⅓ and 3 times the focal length of the first component. The third component is biconcave as in the Cooke triplet and its front surface has a radius of curvature between two and ten times that of its rear surface. The fourth component is sometimes simple and sometimes compound including a negative element cemented onto the front of a higher index positive element. It is either biconvex or weakly meniscus, the curvature of its front surface being algebraically between minus $$\frac{0.5}{F}$$

and plus $$\frac{1.6}{F}$$

and the curvature of its rear surface being numerically greater than $$\frac{1}{F}$$

and less than $$\frac{2.5}{F}$$

The third airspace is greater than 1.5 times and less than 10 times the sum of the first two airspaces. The indices of all the positive elements are above 1.57 and the indices of the first and third components differ by less than 0.05. These features are all recognized by lens designers as belonging to and being more or less distinctive of the type of objective in question. Of course compounding of the various components has been tried for various purposes such as purely for achromatization with various degrees of success.

According to the present invention a lens of this general type includes a second component which is constructed of a negative element cemented onto the front of a positive element of higher index, the index difference being greater than 0.08. The upper limit of this index difference is determined by the range of available glasses and is about 0.4 or 0.5.

This structure is especially favorable for reducing the oblique spherical aberration and zonal astigmatism and results in superior sharpness of image up to about 27° from the axis. It is valuable in objectives in which the other three components are simple lenses, but may be combined with compound structure in the other components. Especially I prefer to combine it with a compound rear component of doublet form.

In an objective according to my invention the focal length of the second component is preferably restricted to the range from 0.8 to 2.8 times the focal length of the first component, the radius of curvature of its front surface is preferably longer than that of the front surface of the first component, and the front positive component is meniscus in shape.

In a preferred form of the invention the power of the cemented surface in the second component is greater than $$\frac{0.3}{F}$$

and the first and third components are simple lens elements.

In my U. S. Patent 2,259,004, a similar structure of the second component is shown combined with a triplet rear component. According to the present invention, however, the break in index at the cemented surface is greater and according to the preferred forms the power of this surface is considerably greater than the radius of curvature of the front surface of this component is longer. These features combine favorably with the simpler rear component to control the Petzval sum and the zonal astigmatism. The simpler structure of the rear component, of course, results in lower manufacturing costs.

Figures 1, 2:
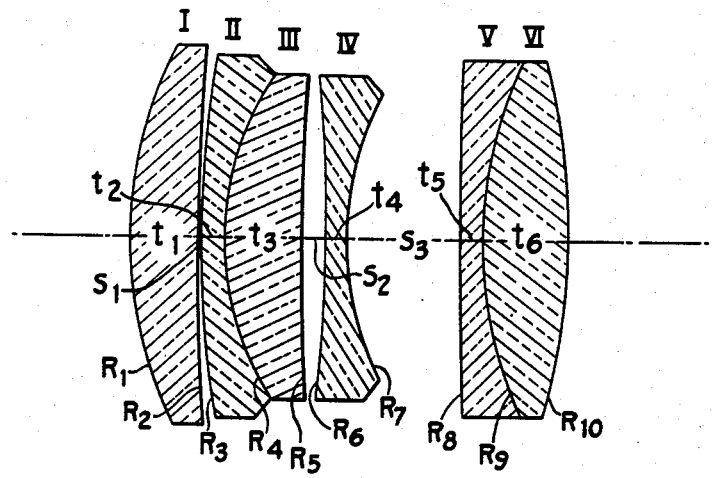
Fig. 1 shows an objective according to the invention.
Fig. 2 shows the constructional data for one embodiment.

The constructional data are as follows:

F=100mm.  F/2.7

| Lens | $N_D$ | V | Radii | Thicknesses |
|---|---|---|---|---|
| I | 1.620 | 60.4 | $R_1=+$ 39.0 mm. | $t_1=$ 6.5 mm. |
|  |  |  | $R_2=+$ 201.8 | $S_1=$ 0.2 |
| II | 1.617 | 38.5 | $R_3=+$ 103.6 | $t_2=$ 2.0 |
| III | 1.744 | 45.7 | $R_4=+$ 27.0 | $t_3=$ 7.5 |
|  |  |  | $R_5=+$ 194.6 | $S_2=$ 2.0 |
| IV | 1.605 | 43.6 | $R_6=-$ 132.2 | $t_4=$ 1.9 |
|  |  |  | $R_7=+$ 28.9 | $S_3=$ 10.7 |
| V | 1.523 | 50.9 | $R_8=+$ 1290.0 | $t_5=$ 2.0 |
| VI | 1.620 | 60.4 | $R_9=+$ 38.5 | $t_6=$ 8.0 |
|  |  |  | $R_{10}=-$ 62.2 | B.F.=73.3 |

This embodiment has all the features of the preferred form of the invention. The second component is meniscus in shape and made of a negative element cemented to the front of a positive element with index higher by 0.127 than the negative element, the cemented surface having a power of $$\frac{0.5}{F}$$

The focal length of the second component is 1.8 times the focal length of the first. The other features are readily apparent from the above table of data.

I claim:

1. A high aperture photographic objective comprising four air-spaced components in the following order, a front positive component, a meniscus positive component convex toward the front, a biconcave component, and a rear positive component, the latter two components being separated by a distance between 1.5 and 10 times the sum of the other two airspaces between the first three components, the front surface of the front positive component being convex with a radius of curvature between 0.3F and F where F is the focal length of the objective, the meniscus positive component consisting of a negative element cemented to the front of a positive element and having a focal length between one-third and three times the focal length of the front positive component, the positive element of the meniscus positive component having an index of refraction greater than that of the negative element by more than 0.08, the front surface of the biconcave component having a radius of curvature greater than twice but not greater than ten times the radius of curvature of the rear surface of the same component, and the rear component having for its front surface a curvature algebraicly between minus 0.5/F and plus 1.6/F and for its rear surface a curvature between minus 1.0/F and minus 2.5/F.

2. An objective according to claim 1 in which the radius of curvature of the front surface of the meniscus positive component is between one and five times the radius of curvature of the front surface of the front positive component and the focal length of the meniscus positive component is between 0.8 and 2.8 times that of the front positive component.

3. A high aperture photographic objective consisting of four air spaced components, the first component being a meniscus positive element with refractive index between 1.58 and 1.64, the second component being a meniscus positive doublet concave toward the rear consisting of a a negative element cemented to the front of a higher index positive element and having a focal length between 0.8 and 2.8 times the focal length of the first component, the third component being a biconcave element with refractive index differing from that of the first component by less than 0.05 and having the radius of curvature of its front surface between two times and ten times the radius of curvature of its rear surface, and the fourth component being a biconvex doublet consisting of a negative element cemented to the front of a higher index positive element, and the distance from the third to the fourth component being greater than the sum of the distances from the first to the second and from the second to the third components characterized by the front surface of the front component having a radius of curvature between 0.3 F and 0.5 F where F is the focal length of the objective, the front surface of the second component having a radius of curvature longer than that of the front surface of the front component, the power of the cemented surface of the second component being greater than $$\frac{0.3}{F}$$

and the index difference at this cemented surface being greater than 0.08.

4. A photographic objective having substantially the following specifications:

| Lens | $N_D$ | V | Radii | Thicknesses |
|---|---|---|---|---|
| I | 1.62 | 60 | $R_1=+$ .39f | $t_1=0.065f$ |
|  |  |  | $R_2=+$ 2.0 f | $S_1<0.01$ f |
| II | 1.62 | 38 | $R_3=+$ 1.0 f | $t_2=0.02$ f |
| III | 1.74 | 46 | $R_4=+$ 0.27f | $t_3=0.075f$ |
|  |  |  | $R_5=+$ 1.9 f | $S_2=0.02$ f |
| IV | 1.61 | 44 | $R_6=-$ 1.3 f | $t_4=0.02$ f |
|  |  |  | $R_7=+$ 0.29f | $S_3=0.11$ f |
| V | 1.52 | 51 | $R_8=+$ 13. f | $t_5=0.02$ f |
| VI | 1.62 | 60 | $R_9=+$ 0.39f | $t_6=0.08$ f |
|  |  |  | $R_{10}=-$ 0.62f |  | where the first column gives the lens elements in roman numerals in order from front to rear and indicates air spaces by dashes and where f is the focal length of the objective, $N_D$ is the index of refraction for the D line of the spectrum, V is the dispersive index, R, t and S refer respectively to the radii of curvature of the refractive surfaces, the thicknesses of the elements, and the air spaces between the elements, the subscripts on these refer to the surfaces, the elements, and the spaces numbered consecutively from the front, and the + and − signs in the fourth column correspond to surfaces which are respectively convex and concave to the front.

5. A high aperture photographic objective comprising four airspaced components in the following order, a front positive component, a meniscus positive component convex toward the front, a biconcave component, and a rear positive component, characterized by the meniscus positive component being compound with a positive element having an index of refraction greater than 1.7 cemented to the rear of a negative element whose index of refraction is at least .08 less than that of said positive element.

6. A high aperture photographic objective comprising a single meniscus positive element convex to the front as its front component, a compound positive rear component and between said front and rear components a member including at least two negative elements and at least one positive element, one of the negative elements being at the rear of the member, said at least one positive element having an index of refraction greater than 1.7 and being cemented to the other of said negative elements which other of said negative elements has a refractive index at least .08 less than that of said one positive element.

WILLY SCHADE.

CERTIFICATE OF CORRECTION.

Patent No. 2,336,300.                                        December 7, 1943.

WILLY SCHADE.

It is hereby certified that error appears in the printed specification of the above numbered patent requiring correction as follows: Page 2, first column, line 9, for "greater than" read --greater and--; and that the said Letters Patent should be read with this correction therein that the same may conform to the record of the case in the Patent Office.

Signed and sealed this 15th day of February, A. D. 1944.

(Seal)
                                        Henry Van Arsdale,
                                        Acting Commissioner of Patents.